(12) United States Patent
Tian et al.

(10) Patent No.: US 7,890,287 B2
(45) Date of Patent: Feb. 15, 2011

(54) LINK TRANSMITTER SWING COMPENSATION

(75) Inventors: Kathy Tian, Sunnyvale, CA (US);
Harry Muljono, San Ramon, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/772,193

(22) Filed: Jun. 30, 2007

(65) Prior Publication Data
US 2009/0006022 A1    Jan. 1, 2009

(51) Int. Cl.
*G06F 19/00* (2006.01)
(52) U.S. Cl. ...................................................... 702/122
(58) Field of Classification Search .................. 702/117, 702/122; 710/29, 105, 106; 375/240.26, 375/240.27; 372/38.02
See application file for complete search history.

(56) References Cited

U.S. PATENT DOCUMENTS

| | | | |
|---|---|---|---|
| 6,725,304 B2* | 4/2004 | Arimilli et al. | 710/106 |
| 7,288,967 B2* | 10/2007 | Byun et al. | 326/83 |
| 2005/0030108 A1* | 2/2005 | Duncan et al. | 331/16 |
| 2005/0271099 A1* | 12/2005 | Miremadi | 372/38.02 |
| 2006/0049893 A1* | 3/2006 | Ozasa et al. | 333/124 |
| 2007/0075776 A1* | 4/2007 | Garlapati et al. | 330/259 |

* cited by examiner

*Primary Examiner*—Bryan Bui
(74) *Attorney, Agent, or Firm*—Erik R. Nordstrom

(57) ABSTRACT

To allow for reference current settings per multi-bit link (or alternatively, per apparatus), approaches for implementing closed-loop Tx swing control based on monitoring of a dummy circuit is provided herein. In accordance with some embodiments, provided is a dummy bit-link circuit to model operable bit-links in a multi-bit link, where each bit link has a transmitter with an adjustable swing level. Also provided is a reference generator circuit to control the transmitter swing levels based on test data driven through the dummy bit-link.

12 Claims, 2 Drawing Sheets

LINK TRANSMITTER SWING COMPENSATION

BACKGROUND

Chip-to-chip communication is commonly implemented with high-speed, point-to-point links such as with differential point-to-point links transmitting differential data signals. Achievable data rates can be affected by voltage and timing margins of the transmitted signals. For example, deviations from specified transmitted voltage swings during operation can result in decreased margins and therefore a decreased data-rate. Unfortunately, it is difficult to control voltage swing levels because they vary with operating environment changes such as with changes in PVT (process, voltage, and temperature) and physical structure such as trace lengths, and the like. Because changes generally affect the various transmitter circuits within a chip the same, chips typically incorporate one or more distributed general (or global) compensation circuits to control multiple transmitter circuits reasonably proximal to the compensation circuit to compensate for such variations.

FIG. 1 shows a conventional multi-bit point-to-point link with global current compensation (I-Comp) and termination resistance compensation (R-Comp) to control (e.g., keep reasonably sufficient) output voltage swing magnitudes in accordance with design specifications. It comprises N transmitter drivers 101 to be coupled to N corresponding receivers (e.g., on a different chip, not shown). Each driver has an associated pair of variable termination resistors to convey differential data signals (Dini, Dini#). Also included is a global current compensation (I-Comp) circuit 103, which uses a reference current (I-Ref) to generate and distribute multiple copies of current, $I_1$ through $I_N$, to each individual TX driver (Tx1 to TxN). The current is used to generate a desired output swing that is also affected by the values of the termination resistors. A global resistance compensation (R-Comp) circuit 105 is also included to generate resistance compensation signals from an R-Ref control resistor.

Transmitter swing specifications are typically determined through system simulations and are set high enough to meet target frequency and bit error rate (BER) objectives under worst case platform and system parameters due to operational, environmental, and/or implementation deviations. The global reference current value is then typically programmed (e.g., via fuses or the like) into the reference circuit 103 to generate a sufficient swing magnitude under these worst case conditions.

Unfortunately, this can be inefficient since in many cases, higher swing levels (and thus higher currents) than are needed are generated. For example, with some platforms, mother board trace impedances (per unit length) can vary +/−12%. The lengths of traces can also vary up to 10%. This can be fairly costly. With some platforms, for example, for every two inches of trace length increase, a Tx swing increase of 100 mV may be required. Accordingly, improved approaches may be desired.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

To allow for reference current settings per multi-bit link (or alternatively, per apparatus), approaches for implementing closed-loop Tx swing control based on testing a dummy circuit is provided herein. In some embodiments, a dummy transmitter and receiver circuit, along with realistic (or even worst-case) package and board traces, are included with a multi-bit link to support transmitter swing control for the link. Test data is driven through the dummy link until a suitable swing level reference is identified for achieving sufficient transmission of the test data.

Figure 2:
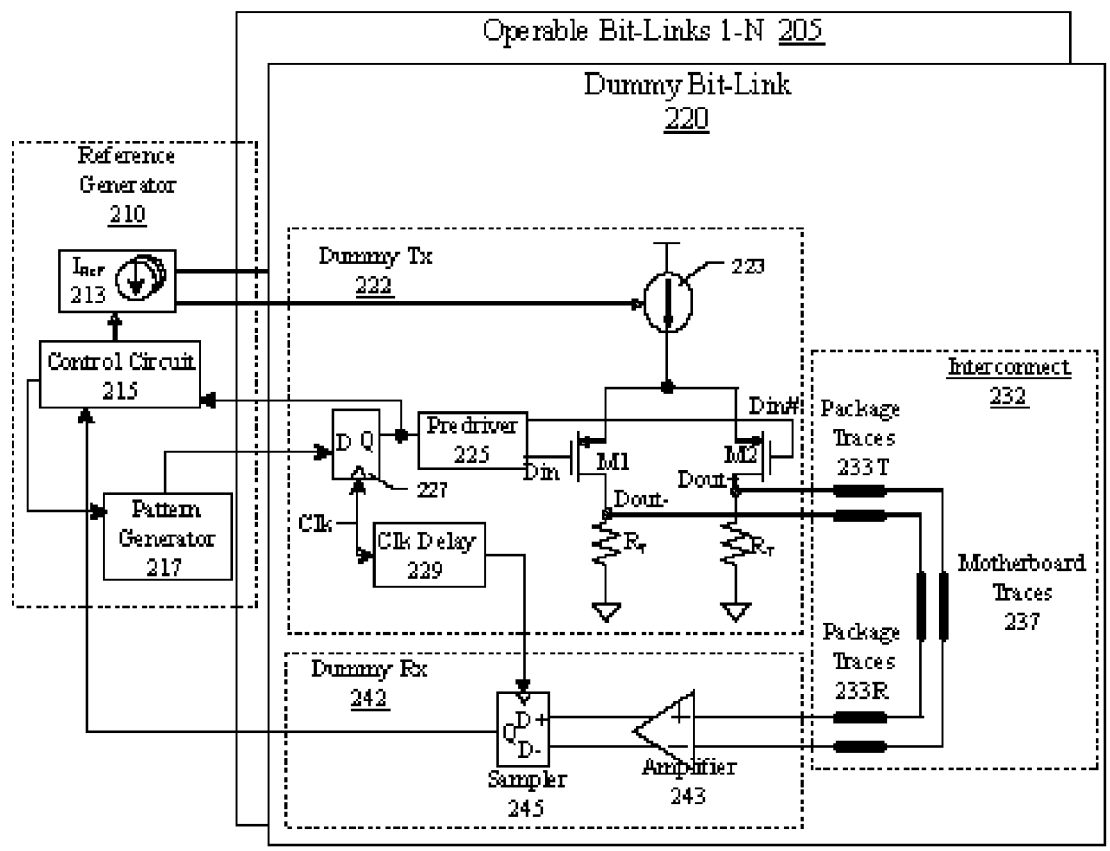
FIG. 2 is a schematic diagram of a multi-bit, point-to-point link with global transmitter driver compensation in accordance with some embodiments.

FIG. 2 shows a multi-bit point-to-point link 205 comprising N separate operable bit-links (e.g., intended to convey control, data, or clock bit information) with a reference circuit 210 and a dummy (model) bit-link circuit 220 to provide a reference signal for biasing the operable bit-links based on test results for the dummy circuit 220. The reference circuit 210 is coupled to the bit-links of multi-bit link 205 and to the dummy link 220. The dummy link 220 models the individual bit links from link 205. The reference circuit 210 sets the reference to a low level, drives test data into the dummy circuit, and reads it back to determine if its bit error rate (BER) is sufficiently low. If not, it increments the reference signal (which is applied to each of the links and to the dummy link 220) and repeats the test. It continues this until an acceptable bit error rate is attained. (It should be appreciated that in other embodiments, it could start with the reference at any level and adjust it, up or down, based on measured bit error rate.)

Figure 1:
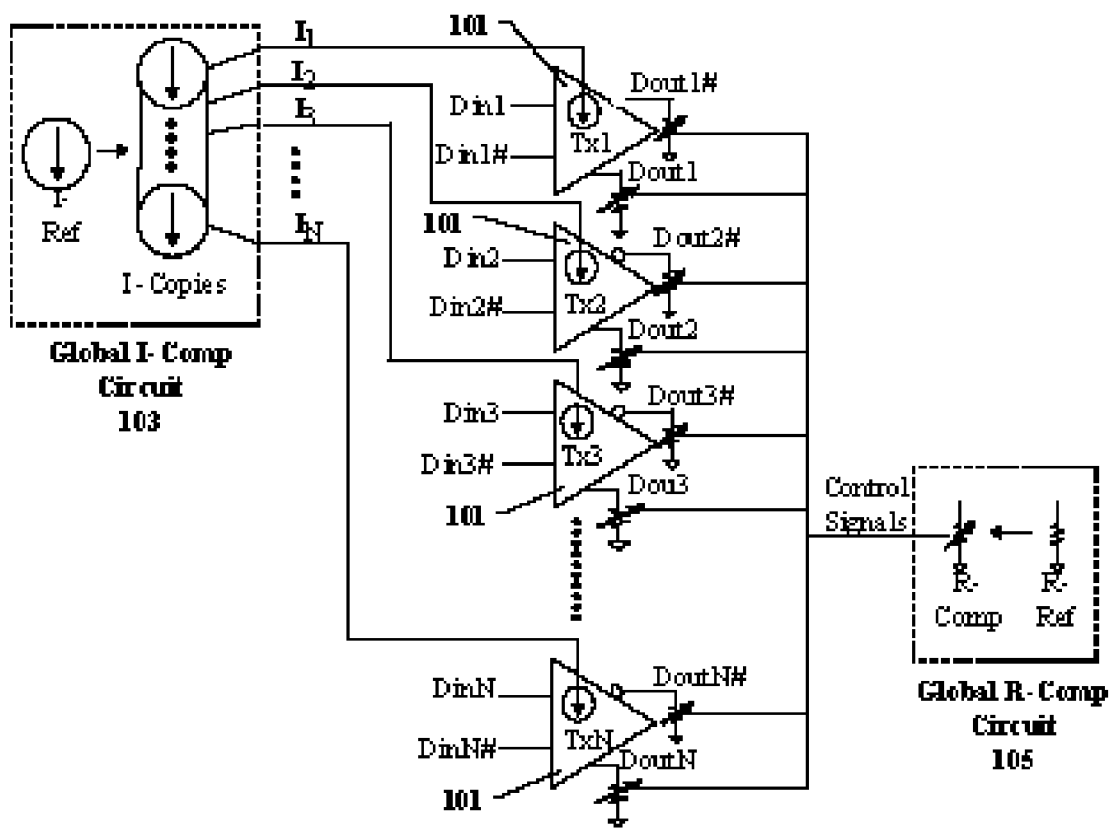
FIG. 1 is a schematic diagram of a conventional multi-bit, point-to-point link with fixed global transmitter driver compensation.

The reference circuit 210 comprises a current bias reference generator circuit 213, a control circuit 215, and a pattern generator circuit 217. with the depicted link, as with the design in FIG. 1, the transmitter drivers are biased with current reference signals. Accordingly, reference circuit 213 comprises current bias generation circuitry that is tuneable by the control circuit 215. The reference circuit 213 provides a copy of the generated bias signal to each of the N links 105, as shown, along with to the dummy link 110.

The pattern generator circuit 217 generates a bit pattern, e.g., pseudo random pattern, and provides it to be driven into the dummy link 210. In some embodiments, it is driven at a rate that is comparable (e.g., 4 Gbits/sec. or more) to the rate at which data will be driven over the bit-links 205. The control circuit 215 has a comparator (e.g., digital comparison logic) to compare the generated data (from the pattern generator by way of a latch in the dummy transmitter portion) with comparable data received back from the dummy receiver 242 in the dummy link 210. Based on this comparison, the control circuit 215 determines if the BER is sufficiently low and controls the reference level from reference circuit 213 until a sufficiently low BER is attained. Once the reference level for attaining the sufficiently low BER is identified, the control circuit 215 sets the reference generator 213 to provide it to the operable bit-links.

The dummy link 220 comprises a dummy transmitter circuit 222 and a dummy receiver 242 communicatively coupled together through an interconnect 232. The dummy transmitter circuit 222 comprises a transmitter driver formed from adjustable current source 223, differentially coupled MOS transistors M1, M2, and termination resistors $R_T$, coupled together as shown. it also comprises a predriver circuit 225, coupled to the driver at inputs of the MOS transistors M1, M2 to provide them with a differential input corresponding to a single-ended data bit received from a bit latch 227, which, in turn, receives the generated test bit stream from the pattern generator 217. The transmitter 222 also has a clock delay circuit 229 to provide to the receiver 242 a delayed version of the clock used to clock the latch 227.

In some embodiments, the interconnect 232 may model the worst case interconnect that may be part of the multi-bit link 205. It comprises transmitter side package traces 233T, motherboard traces 237, and receiver side traces 233R, arranged to couple the dummy transmitter 222 to the dummy receiver 242.

The dummy receiver circuit 242 comprises differential amplifier 243 coupled between the interconnect 232 and a differential to single-ended sampler latch 245. An output of the latch 245 is coupled to the control circuit 215, and its clock input is coupled to the clock delay 229. The delay is selected in accordance with the time it will take data to travel from the predriver 225 to the output of amplifier 243 so that comparable (or corresponding) data bits are at the control circuit 215 for meaningful comparison.

Operation of the dummy and reference circuits in accordance with some embodiments will now be described. The control circuit 215 initially (e.g., at power-up) sets the reference circuit 213 to start with a minimum reference level for biasing the dummy transmitter's driver through its current source 223. The pattern generator 217 sends test data, in a bit stream, at speeds comparable to the operating link 205 (e.g., 4 Gbits/sec. to 8 Gbits/sec.) to the dummy Transmitter input latch 227. The data is clocked and sent to dummy Transmitter predriver 225, which drives the data differentially (Din/Din#) to the input of the driver at transistors M1, M2.

The dummy Transmitter driver generates a differential output signal (Dout+/Dout−) with an associated swing magnitude corresponding to the reference bias applied to its current source 223. The data is driven through the interconnect 232 to the dummy receiver amplifier 243, which provides it to sampler latch 245.

The data is latched by sampler latch 245 with a delay so that received data bits corresponding to data sent from the pattern generator 217 is provided to the control circuit 215 for meaningful comparison. That is, a data bit at the output of latch 227 should correspond to latched data at the output of sampler latch 245. The comparator compares the data sent out by the pattern generator and the data received by the dummy receiver. Comparisons, from streamed bit pairs, are accumulated over a sufficient number of clocks to determine a meaningful bit error rate. If the BER is not sufficiently low (as determined by the controller based on, for example, a preprogrammed threshold), it controls the reference generator 213 to increase (e.g., increment, by one or more units, or by an analog amount) the reference bias to increase the swing at the transmitter driver output. It repeats this until a desired BER is met. The value of the reference bias ($I_{Ref}$) that leads to the suitable BER is then provided to the transmitters in the separate bit-links of multi-bit link 205. A certain percentage of programmable guardband could be added on top of the value delivered to the link transmitters.

In the preceding description, numerous specific details have been set forth. However, it is understood that embodiments of the invention may be practiced without these specific details. In other instances, well-known circuits, structures and techniques may have not been shown in detail in order not to obscure an understanding of the description. With this in mind, references to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the preceding description and following claims, the following terms should be construed as follows: The terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not be in direct physical or electrical contact.

The term "PMOS transistor" refers to a P-type metal oxide semiconductor field effect transistor. Likewise, "NMOS transistor" refers to an N-type metal oxide semiconductor field effect transistor. It should be appreciated that whenever the terms: "MOS transistor", "NMOS transistor", or "PMOS transistor" are used, unless otherwise expressly indicated or dictated by the nature of their use, they are being used in an exemplary manner. They encompass the different varieties of MOS devices including devices with different VTs, material types, insulator thicknesses, gate(s) configurations, to mention just a few. Moreover, unless specifically referred to as MOS or the like, the term transistor can include other suitable transistor types, e.g., junction-field-effect transistors, bipolar-junction transistors, metal semiconductor FETs, and various types of three dimensional transistors, MOS or otherwise, known today or not yet developed.

The invention is not limited to the embodiments described, but can be practiced with modification and alteration within the spirit and scope of the appended claims. For example, it should be appreciated that the present invention is applicable for use with all types of semiconductor integrated circuit ("IC") chips. Examples of these IC chips include but are not limited to processors, controllers, chip set components, programmable logic arrays (PLA), memory chips, network chips, and the like.

It should also be appreciated that in some of the drawings, signal conductor lines are represented with lines. Some may be thicker, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

It should be appreciated that example sizes/models/values/ranges may have been given, although the present invention is not limited to the same. As manufacturing techniques (e.g., photolithography) mature over time, it is expected that devices of smaller size could be manufactured. In addition, well known power/ground connections to IC chips and other components may or may not be shown within the FIGS, for simplicity of illustration and discussion, and so as not to obscure the invention. Further, arrangements may be shown in block diagram form in order to avoid obscuring the invention, and also in view of the fact that specifics with respect to implementation of such block diagram arrangements are highly dependent upon the platform within which the present invention is to be implemented, i.e., such specifics should be well within purview of one skilled in the art. Where specific details (e.g., circuits) are set forth in order to describe example embodiments of the invention, it should be apparent to one skilled in the art that the invention can be practiced without, or with variation of, these specific details. The description is thus to be regarded as illustrative instead of limiting.

What is claimed is:

1. An apparatus, comprising:
a dummy bit-link to model operable bit-links in a multi-bit link, each bit link having a transmitter with an adjustable swing level, the dummy bit-link including an interconnect formed from one or more signal path components defining a signal path between a dummy transmitter and a dummy receiver, the one or more dummy link signal path components having signal transmission characteristics representative of operable multi-bit link signal transmission characteristics; and
a reference generator circuit to control the transmitter swing levels based on test data driven through the dummy bit-link until a suitable swing level reference is identified for achieving sufficient transmission of the test data.

2. The apparatus of claim 1, in which the dummy bit-link comprises an interconnect that models worst-case interconnect characteristics of interconnects for the operable bit-links.

3. The apparatus of claim 1, in which the reference generator generates a current bias reference signal and provides the current bias reference signal to each operable bit-link to control its swing level.

4. The apparatus of claim 3, in which the current bias reference signal is a global reference signal, and each bit-link transmitter may be further controlled with a local reference signal.

5. The apparatus of claim 1, in which the swing level for the dummy bit-link is to be set at an initially low level and incremented until the test data generates a sufficiently low bit error rate.

6. The apparatus of claim 5, in which the reference generator circuit comprises a control circuit to determine if the bit error rate is sufficiently low.

7. The apparatus of claim 6, in which the control circuit comprises a digital comparator to compare the test data provided to the dummy bit-link with corresponding data received back from it.

8. The apparatus of claim 1, in which the multi-bit link is to provide a communications link between a first and a second chip.

9. An apparatus, comprising:
a multi-bit link including operable bit links and a dummy bit-link to have driven through it test data to identify a suitable swing-level reference in the dummy bit-link; and
drivers for the operable bit-links, the drivers to be controlled using the swing level reference identified for the dummy bit link, wherein the test data is driven through the dummy bit link until a suitable swing level reference is identified for achieving sufficient transmission of the test data.

10. The apparatus of claim 9, in which the driven test data is compared with corresponding data received back from the dummy bit-link to determine an associated bit error rate.

11. The apparatus of claim 10, wherein the swing-level reference is initially set to a low level and then incremented until a sufficiently low bit error rate is attained.

12. The apparatus of claim 9, in which the dummy bit-link includes a worst-case interconnect.

* * * * *